N. I. PERRY.
EXPLOSIVE ENGINE VALVE.
APPLICATION FILED APR. 8, 1912.
1,096,124.
Patented May 12, 1914.
2 SHEETS—SHEET 1.
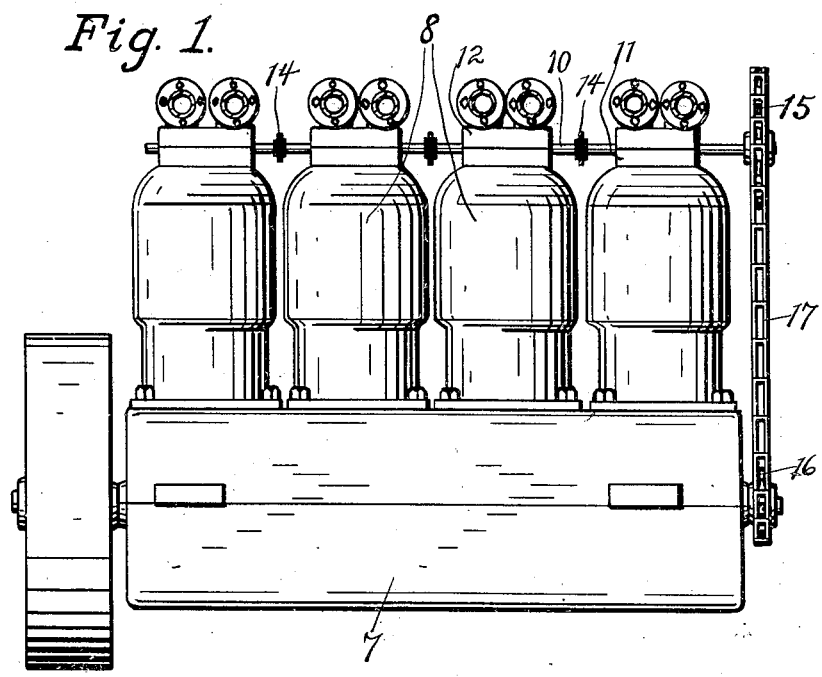
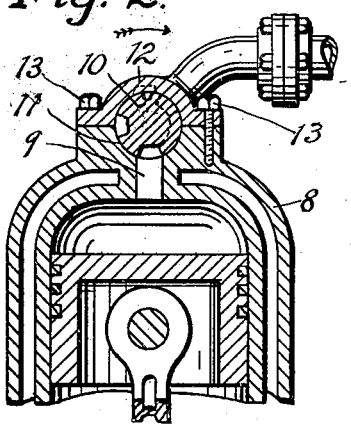
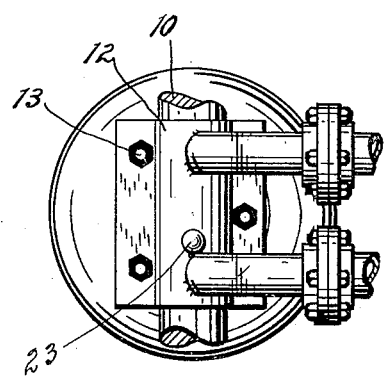
Witnesses;
Thomas Colson
R. W. Stone
Inventor:
Nelson I. Perry,
By Joshua H. Pons
His Attorney.

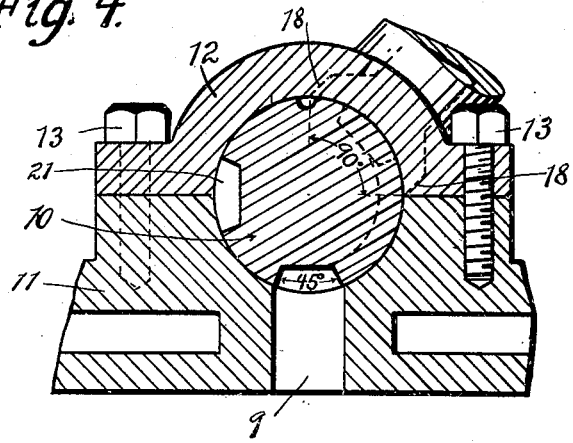
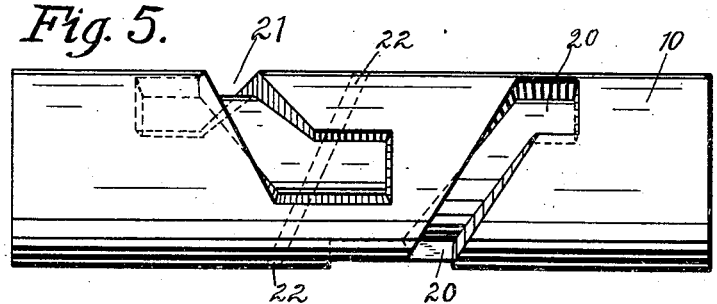
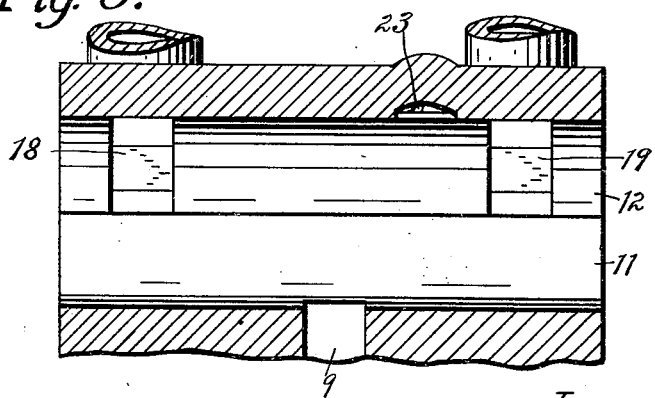

UNITED STATES PATENT OFFICE.

NELSON I. PERRY, OF CHICAGO, ILLINOIS.

EXPLOSIVE-ENGINE VALVE.

1,096,124.  Specification of Letters Patent.  Patented May 12, 1914.

Application filed April 8, 1912. Serial No. 689,344.

*To all whom it may concern:*

Be it known that I, NELSON I. PERRY, a citizen of the United States, and a resident of the city of Chicago, county of Cook, and State of Illinois, have invented certain new and useful Improvements in Explosive-Engine Valves, of which the following is a specification.

My invention relates to valves for internal combustion engines, and the object is to provide a valve of this character which will be simple of construction and efficient in operation.

The invention consists in the combinations and arrangements of parts hereinafter described and claimed.

The invention will be best understood by reference to the accompanying drawings forming a part of this specification, and in which—

Figure 1 is an elevation of an engine constructed in accordance with my invention, Fig. 2 is a fragmental vertical section of one of the cylinders of such engine, Fig. 3 is a top view of the same, Fig. 4 is a vertical section of the valve in its seat, built in accordance with my invention, Fig. 5 is an elevation of the valve, and Fig. 6 is a sectional elevation of the valve seat.

The preferred form of construction, as illustrated in the drawings, comprises an engine 7 having a plurality of cylinders 8, each provided with a port 9 in its top portion serving the alternate functions of intake and exhaust ports. Cylindrical valves 10 are provided to control the opening and closing of said ports, and lower seat portions 11 are formed integrally with said cylinders 8 and upper seat portions 12 are secured to such lower seat portions by means of cap screws 13. Said cylindrical valves 10 are elongated sufficiently to be connected together by means of couplings 14 to be rotated in unison and timed for the proper operation of the engine. Said valves are driven in the relation of two revolutions of the engine crank-shaft to one of said valves by suitable gearing, such as sprockets wheels 15 and 16 and an endless chain 17.

The valves 10 are alike in form and operation, so that the description of one will suffice for all. The valve 10 is fitted to rotate in and form a gas tight joint with its seat portions 11 and 12. The opening of port 9 extends in width a distance corresponding to forty-five degrees of the circumference of said cylindrical valve and in length a distance approximately equal to its width, and valve seat portion 12 is provided with an intake opening 18 of approximately the same length as said port but of a width equal to ninety degrees of the circumference of said cylindrical valve, and with an exhaust opening 19 of substantially the same size as said intake opening, in positions substantially as indicated in the drawings. Said cylindrical valve 10 is provided with a recess 20 extending longitudinally and diagonally around said cylindrical valve, of a width throughout its length equal to the width of said port 9 to register with said port and said intake opening during the suction stroke of its corresponding cylinder. A second recess 21, of like dimensions and extending in opposite longitudinal and diagonal directions, is also formed in said cylindrical valve in a position to register with said port 9 and the exhaust opening 19 at the time of said cylinder's exhaust stroke. A diagonal perforation 22 is formed through said cylindrical valve in a position to register with both the port 9 and a recess 23 formed in the valve seat portion 12, at the time of explosion in the corresponding cylinder. Said opening is provided to reduce the pressure on the revolving valve at the time of explosion.

The operation of my device is as follows: The several cylinders are provided with valves properly timed for the operation of the engine. At the beginning of the suction stroke of one of the cylinders, the recess 20 of the cylindrical valve 10 will begin to register with the port 9 to allow fuel to pass through the intake opening 18, recess 20 and port 9 into the cylinder. The intake opening 18 is of twice the width of the port 9 in order to provide ample space for intake. The valve 10 on turning, as indicated by the arrow in Fig. 2, will pass to a position so that the perforation 22 will register with the port 9 at the time of ignition and a portion of the gases in the cylinder will pass through such perforation 22 into the recess 23 into the valve seat portion 12, which has an area equal to that of the port 9 to reduce the explosive pressure on said valve during the time of explosion. The valve will revolve until the recess 21 registers with the port 9 and exhaust opening 19 at the beginning of the exhaust stroke of the engine to allow the exhaust gases to pass out of the cylinder.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. A device of the kind described comprising a cylinder having a port serving alternate functions of intake and exhaust; a valve seat communicating with said port and having intake and exhaust openings therein on opposite sides of a vertical line through said port; and a rotary valve in said valve seat provided in its periphery with recesses, each of said recesses having one end adapted to register with said port, one having its other end adapted to register with said intake opening and the other having its other end adapted to register with said exhaust opening, substantially as described.

2. A device of the kind described comprising a cylinder having a port serving alternate functions of intake and exhaust; a valve seat communicating with said port and having intake and exhaust openings therein on opposite sides of a vertical line through said port; a recess opposite said port; and a rotary valve in said valve seat provided in its periphery with spiral recesses, each of said spiral recesses having one of its ends adapted to register with said port, one having its other end adapted to register with said intake opening and the other having its other end adapted to register with said exhaust opening, said rotary valve being also provided with an oblique perforation adapted to register with the recess in said valve seat and said port, substantially as described.

3. A device of the kind described comprising a cylinder having a port serving alternate functions of intake and exhaust; a valve seat communicating with said port, having a recess in one of its sides, and provided with intake and exhaust openings therein; a rotary valve mounted in said seat and having recesses therein alternately connecting said port with the intake and exhaust openings in its valve seat upon rotation of the valve, said valve being also provided with an oblique perforation connecting said port with the recess in said valve seat during the time of explosion in the cylinder, substantially as described.

In testimony whereof I have signed my name to this specification in the presence of two subscribing witnesses.

NELSON I. PERRY.

Witnesses:
ARTHUR A. OLSON,
JOSHUA R. H. POTTS.

Copies of this patent may be obtained for five cents each, by addressing the "Commissioner of Patents, Washington, D. C."